(12) United States Patent
Vaccaro et al.

(10) Patent No.: US 11,415,243 B2
(45) Date of Patent: Aug. 16, 2022

(54) SHROUD FOR CABLE HANGERS

(71) Applicant: CommScope Technologies LLC, Hickory, NC (US)

(72) Inventors: Ronald A. Vaccaro, Taylorsville, NC (US); Christopher Stockman, Bella Vista, AR (US); Aviral Joshi, Chicago, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/907,964

(22) Filed: Jun. 22, 2020

(65) Prior Publication Data

US 2021/0010617 A1     Jan. 14, 2021

Related U.S. Application Data

(60) Provisional application No. 62/871,993, filed on Jul. 9, 2019.

(51) Int. Cl.
| | |
|---|---|
| *F16L 3/00* | (2006.01) |
| *F16L 3/13* | (2006.01) |
| *F16L 3/12* | (2006.01) |
| *H02G 3/32* | (2006.01) |
| *F16B 21/06* | (2006.01) |
| *F16L 3/127* | (2006.01) |

(52) U.S. Cl.
CPC ............. *F16L 3/13* (2013.01); *F16B 21/065* (2013.01); *F16L 3/127* (2013.01); *F16L 3/1222* (2013.01); *H02G 3/32* (2013.01)

(58) Field of Classification Search
None
See application file for complete search history.

(56) References Cited

U.S. PATENT DOCUMENTS

| | | | |
|---|---|---|---|
| 6,161,804 A | 12/2000 | Paske et al. | |
| 6,257,530 B1 | 7/2001 | Tsai | |
| 6,354,543 B1 | 3/2002 | Paske | |
| 7,097,142 B1 | 8/2006 | Schmidt | |
| 7,146,688 B2 | 12/2006 | Yi | |
| 7,293,745 B2 | 11/2007 | Catapano | |
| 8,011,621 B2 | 9/2011 | Korczak | |
| 8,191,836 B2 | 6/2012 | Korczak | |
| 8,439,316 B2 | 5/2013 | Feige | |
| 9,306,380 B2 | 4/2016 | Vaccaro | |

(Continued)

FOREIGN PATENT DOCUMENTS

| | | |
|---|---|---|
| JP | 2010288367 A | 12/2010 |
| WO | 2017149271 A1 | 9/2017 |

OTHER PUBLICATIONS

International Search Report and Written Opinion corresponding to International Application No. PCT/US2020/038587 dated Oct. 7, 2020.

(Continued)

*Primary Examiner* — Steven M Marsh
(74) *Attorney, Agent, or Firm* — Myers Bigel, P.A.

(57) ABSTRACT

The present disclosure is directed to a shroud for a cable hanger which may isolate the metal interfaces between cable hangers and their supporting structures. The present disclosure is also directed to an interference mechanism of the shroud which may minimize or eliminate accidental escape of the hanger from a supporting structure.

20 Claims, 20 Drawing Sheets

(56) References Cited

U.S. PATENT DOCUMENTS

| | | |
|---|---|---|
| 9,903,510 B2* | 2/2018 | Joshi .................... F16L 3/13 |
| 2002/0005463 A1 | 1/2002 | Korczak et al. |
| 2005/0109887 A1* | 5/2005 | Catapano .............. F16L 3/222 |
| | | 248/68.1 |
| 2005/0109890 A1 | 5/2005 | Korczak et al. |
| 2009/0230256 A1 | 9/2009 | Widlacki et al. |
| 2009/0294602 A1 | 12/2009 | Korczak |
| 2010/0000763 A1 | 1/2010 | Stansberry, Jr. |
| 2011/0226913 A1 | 9/2011 | Feige |
| 2014/0086704 A1 | 3/2014 | Hemingway et al. |
| 2016/0281881 A1 | 9/2016 | Vaccaro et al. |
| 2016/0281883 A1* | 9/2016 | Vaccaro .................. F16B 1/00 |
| 2018/0045336 A1 | 2/2018 | Vaccaro |
| 2018/0163899 A1 | 6/2018 | Rajpal et al. |
| 2018/0172183 A1 | 6/2018 | Joshi et al. |
| 2020/0041039 A1* | 2/2020 | Varale .................... F16L 3/222 |

OTHER PUBLICATIONS

Extended European Search Report corresponding to European Application No. 16773786.5 dated Oct. 5, 2018.
International Search Report and Written Opinion for corresponding PCT Application No. PCT/US2016/023939, dated Aug. 24, 2016, 11 pages.

* cited by examiner

SHROUD FOR CABLE HANGERS

RELATED APPLICATION

This application claims priority from and the benefit of U.S. Provisional Patent Application No. 62/871,993, filed Jul. 9, 2019, the disclosure of which is hereby incorporated herein by reference in its entirety.

FIELD OF THE INVENTION

The invention relates generally to devices for supporting cables and, in particular, to shrouds for covering hangers used for securing cables to support structures.

BACKGROUND OF THE INVENTION

Cable hangers are commonly used to secure cables to structural members of antenna towers and/or along tunnel walls. Generally, each cable is attached to a structural member by cable hangers mounted at periodically-spaced attachment points.

One popular cable hanger is discussed in U.S. Pat. No. 8,191,836 to Korczak, the disclosure of which is hereby incorporated herein in its entirety. Hangers disclosed therein have generally a U- or C-shaped profile with rounded arms. A locking projection extends from the free end of each arm, and the "root" of the hanger that spans the fixed ends of the arms has a large aperture. The hanger can hold a cable between the arms; gripping of the cable is enhanced by short fingers that extend inwardly from the arms to engage the cable. Hangers can be "stacked" onto each other by inserting the locking projections of one hanger into the large aperture of the next hanger. One variety of cable hanger of this type is the SNAP-STAK® hanger, available from CommScope, Inc. (Joliet, Ill.). The SNAP-STAK® hanger is offered in multiple sizes that correspond to the outer diameters of different cables.

Passive intermodulation (PIM) is a form of signal interference which degrades the performance of electrical systems, especially communications systems. PIM may be generated, for example, by poor contacts in the signal path. In general, however, any nonlinearity introduced into the signal path can contribute to PIM. For example, components external to the signal path but present within the electrical fields generated by the signal transmission may be coupled with the signal path and introduce undesirable nonlinearities leading to PIM generation.

Areas near cellular antennas (i.e., within 1λ, or one wavelength) can be (relatively) high radio frequency (RF) energy environments. Conductive items in these areas, such as hangers and other hardware, can generate undesirable PIM. Typical examples of potential PIM-generating conditions include the combination of metal-on-metal (e.g., steel-on-steel) contact between two or more components, plus low contact pressure and/or relative movement between the steel components at the joint.

In particular, PIM is exacerbated in metal joints which have low or inconsistent clamping pressure, such as when the joints experience relative motion. In some environments, cable hangers are subjected to harsh external forces, including wind, rain, and snow. Such forces cause the hangers to experience time-varying loads which may rock the hangers back and forth, which may even lead to hanger failure. In addition to generating PIM within metal-on-metal joints of the hangers, the rocking motion of the cables themselves may lead to variable contact pressure within the cables' connectors, directly injecting PIM into the signal path.

As such, it may be desirable to provide solutions for hanging cables with reduced (or eliminated) likelihood of PIM generation.

SUMMARY

As a first aspect, embodiments of the invention are directed to a shroud for a cable hanger which generally secures a cable to a supporting structure. In one embodiment, the shroud comprises a body, and the body has an outward surface and an inward surface. The outward surface includes an outward receiving surface, and the inward surface includes an interference feature, which comprises a projection. The inward surface optionally includes an inward receiving surface.

As a second aspect, embodiments of the invention are directed to a cable hanger. The cable hanger comprises a base panel. The cable hanger also comprises a first arm and a second arm, each of which has a proximal end and a distal end (the proximal end being attached to the base panel). The distal ends of each of the first and second arms comprise first locking projections and second locking projections, respectively, which are configured to be inserted into an aperture of a structure. The first locking projections comprise a first contact surface, and the second locking projections comprise a second contact surface. A first shroud is disposed along the first contact surface of the hanger, and a second shroud is disposed along the second contact surface of the hanger. Further embodiments of the invention are directed to methods for the production, assembly, and use of cable hangers described herein.

As a third aspect, embodiments of the invention are directed to a method for producing a cable hanger shroud comprising the step of configuring a shroud to electrically isolate the cable hanger from a structure. The cable hanger is generally configured to attach to an aperture of the structure where the cable hanger and the aperture are substantially metallic. Further embodiments of the invention are directed to methods for the production, assembly, and use of cable hangers described herein.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an", and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
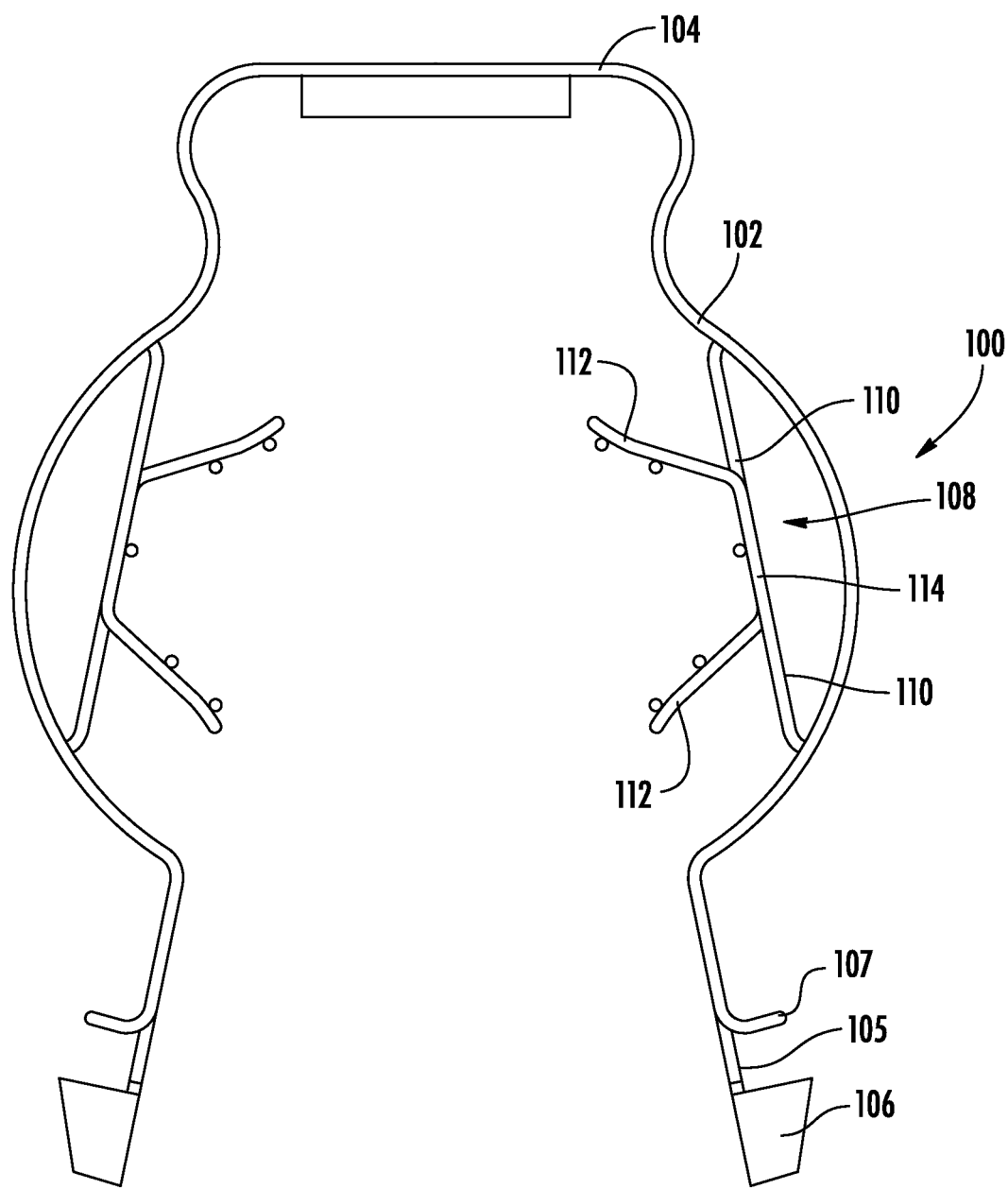
FIG. 1 is a side view of an exemplary cable hanger.

Referring now to the figures, a cable hanger, designated broadly at 100, is shown in FIG. 1. The hanger 100 includes curved arms 102 that extend from a generally flat base 104. Locking projections 106 extend from the free ends (i.e., the distal ends) of the arms 102. Locking tabs 107 may also extend from the arms 102 at positions typically spaced apart from and proximal to the locking projections 106. In some embodiments, the hanger 100 also contains a gripping mechanism 108. The gripping mechanism 108 employs two adjacent cantilevered tabs 110 extending from the interior surface of the arm 102. The cantilevered tabs 110 may terminate in grip pads 112 and may optionally be joined together by a joint 114. When cables are inserted into the hanger 100, the gripping mechanism 108 accepts the cables within the cantilevered tabs 110 and grip pads 112 to secure and center the cables within the hanger 100. Various embodiments of the gripping mechanism 108 may be provided, as discussed in U.S. Pat. No. 9,866,004 to Vaccaro, the disclosure of which is hereby incorporated herein in its entirety.

Figure 2:
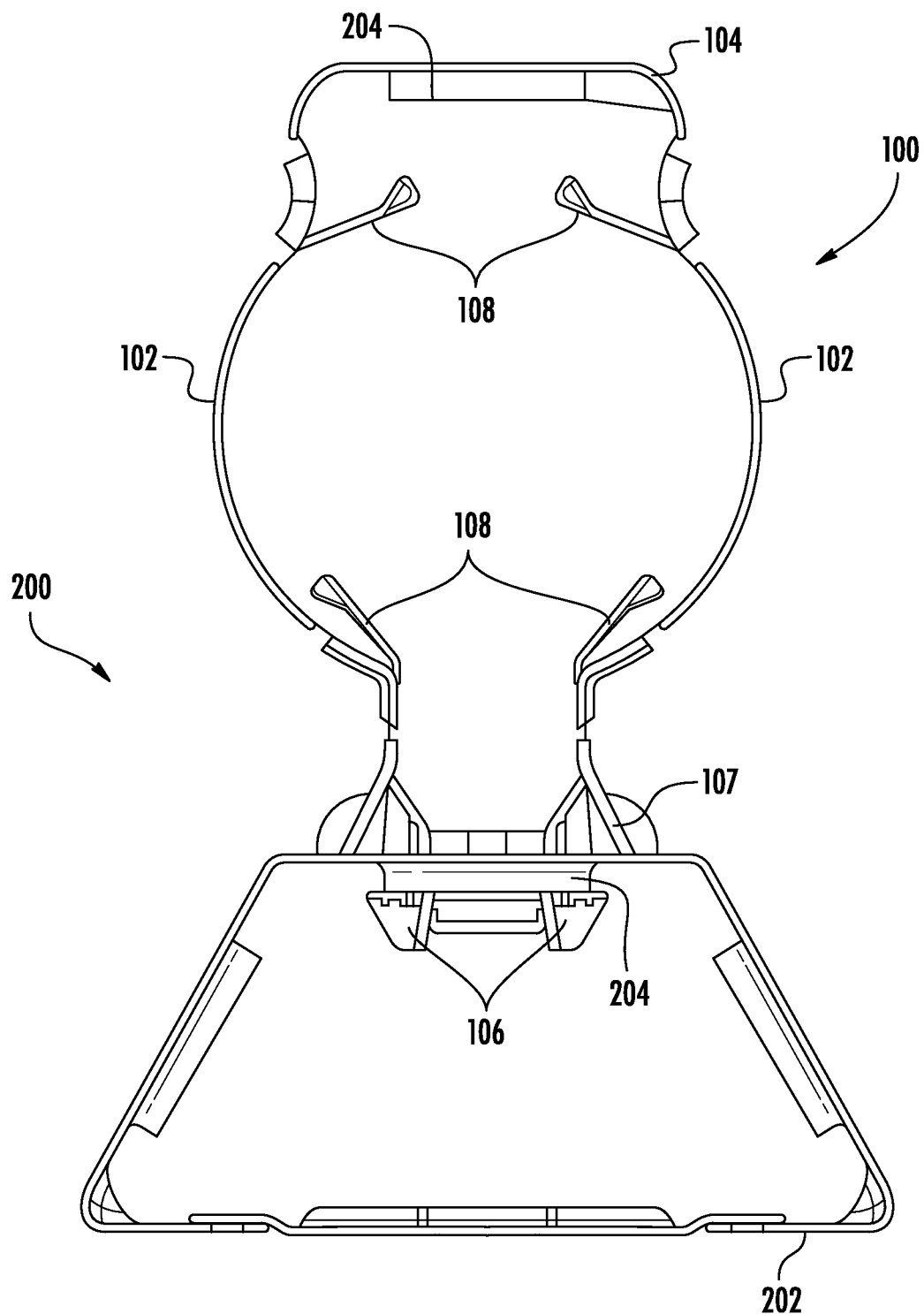
FIG. 2 is a side view of an exemplary cable hanger installation.

As can be seen in FIG. 2, a cable hanger installation 200 is formed when the locking projections 106 are inserted through an optionally reinforced hole or aperture 204 to mate the hanger 100 to a structure 202 (e.g., a tower structure). The base 104 of the hanger 100 may optionally include a second reinforced hole 204 that can receive the locking projections 106 of another hanger 100 to mount a second cable or group of cables. The locking tabs 107 and the locking projections 106 cooperatively form a receiving surface 105 which contacts, grips, cradles, and/or captures the reinforced hole 204, thereby forming one embodiment of a contact surface on the distal end of the arms 102. Once attached, the arms 102 together generally define a circle within which a cable can be grasped, as may be aided by a gripping mechanism 108.

Those skilled in this art will appreciate that the cable hangers 100 discussed above are typically formed of a metallic material, such as steel, and may be formed as a unitary member (often from a flat blank stamped from sheet steel and bent into a desired shape). Also, it will be apparent to those of skill in this art that the cable hangers 100 can be arranged in a "stacked" relationship by inserting the locking projections 106 of one cable hanger 100 into a mounting hole 204 in the base 104 of a second cable hanger 100 in the manner described above with respect to the solitary cable hanger 100 in FIG. 2. The second cable hanger 100 may be identical to or different from the first cable hanger 100 as needed for hanging the cable in question. Thus, as used herein, the structure 202 may refer to either a different structure (e.g., a tower) or another hanger 100.

The foregoing demonstrates one type of metal-on-metal joint in an exemplary cable hanger installation 200: the receiving surface 105, bounded by the locking tabs 107 and the locking projections 106, forms the contact surface between the hanger 100 and the structure 202. The metal-on-metal contact is susceptible to generating PIM, especially when exposed to high energy RF fields.

Figure 3:
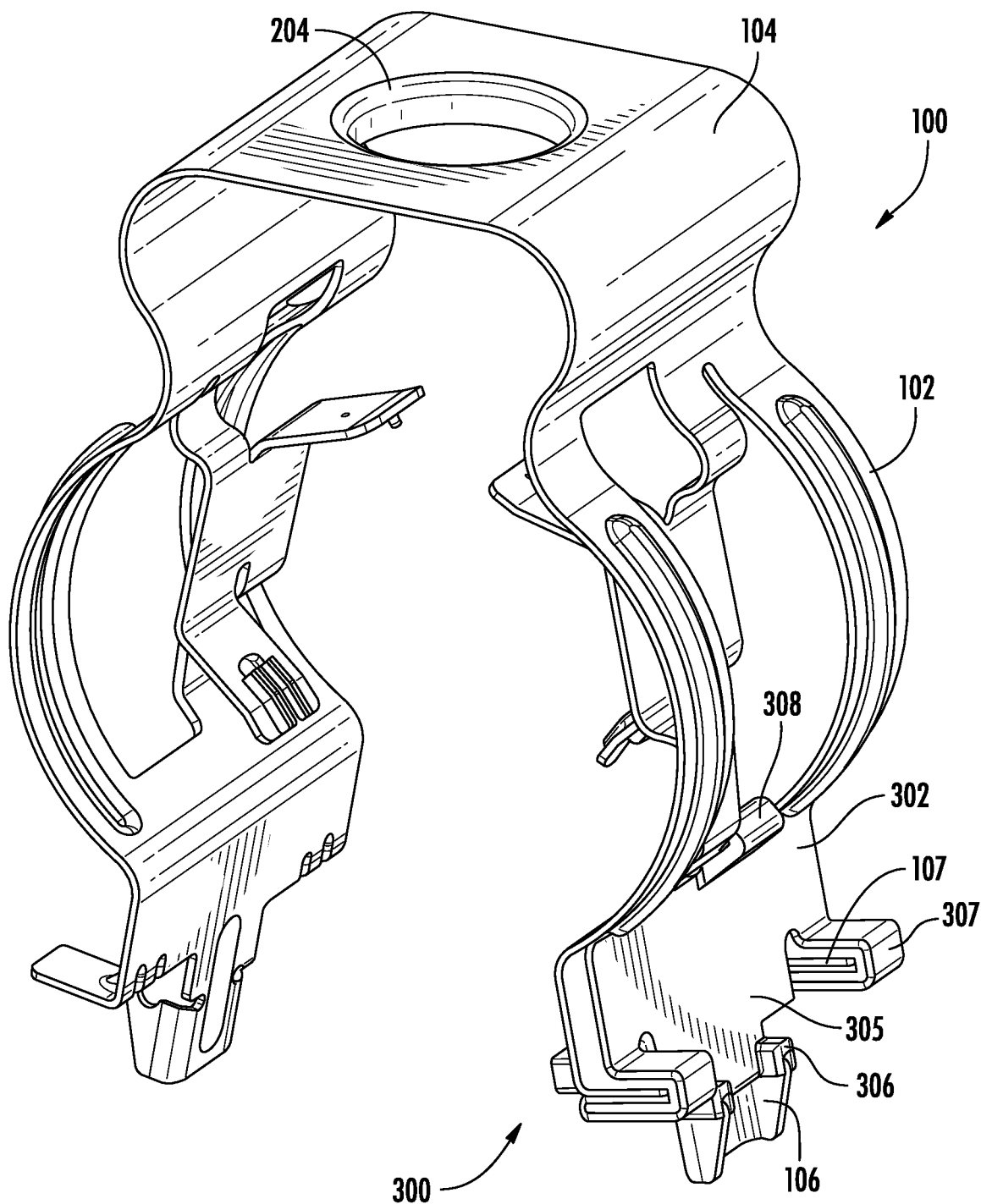
FIG. 3 is a front perspective view of one embodiment of a shroud attached to a cable hanger of FIG. 1.
Figure 4:
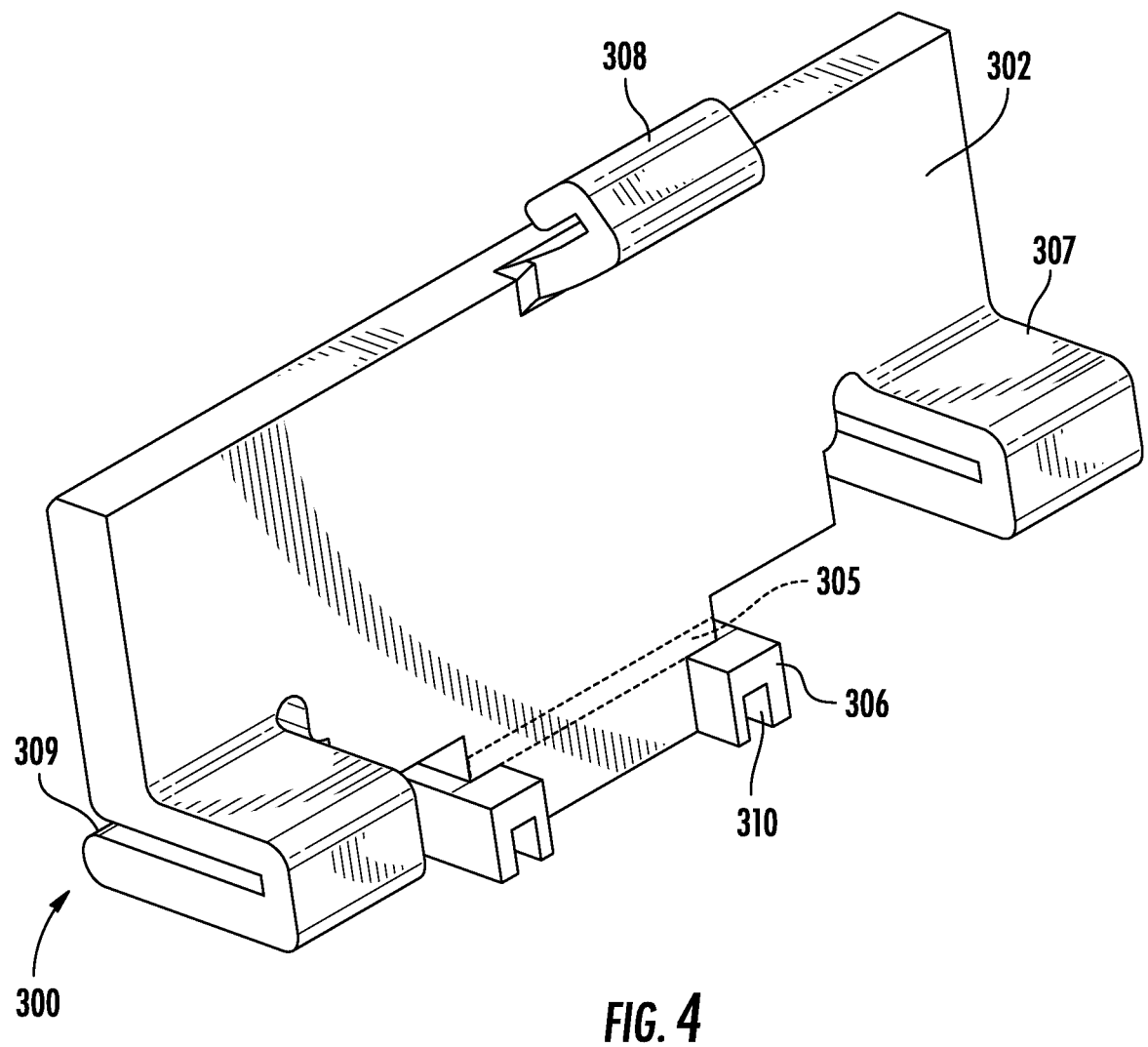
FIG. 4 is a front perspective view of the shroud of FIG. 3.

In one embodiment of the present invention, a shroud may be placed over the contact surfaces of the hanger 100 to minimize and/or eliminate metal-on-metal contact with the structure 202. For instance, FIG. 3 depicts a shroud 300 placed over a contact surface of a hanger 100. The shroud 300 has a body; the outward surface 302 of the body is visible in FIG. 3. The locking tabs 107 are enclosed in locking tab covers 307, while the locking projections 106 are covered by the locking projection covers 306. As seen in FIG. 4, the locking tabs 107 are received by an inward receiving surface 309. The locking projections 106 may optionally reside within indexing slots 310. The indexing slots 310 may serve to align the shroud 300 into the proper orientation and location for attachment to the hanger 100. A locking feature, such as a snap feature 308, may mate with the hanger 100 to secure the shroud 300 to the hanger 100, as shown in FIG. 3.

Figure 5:
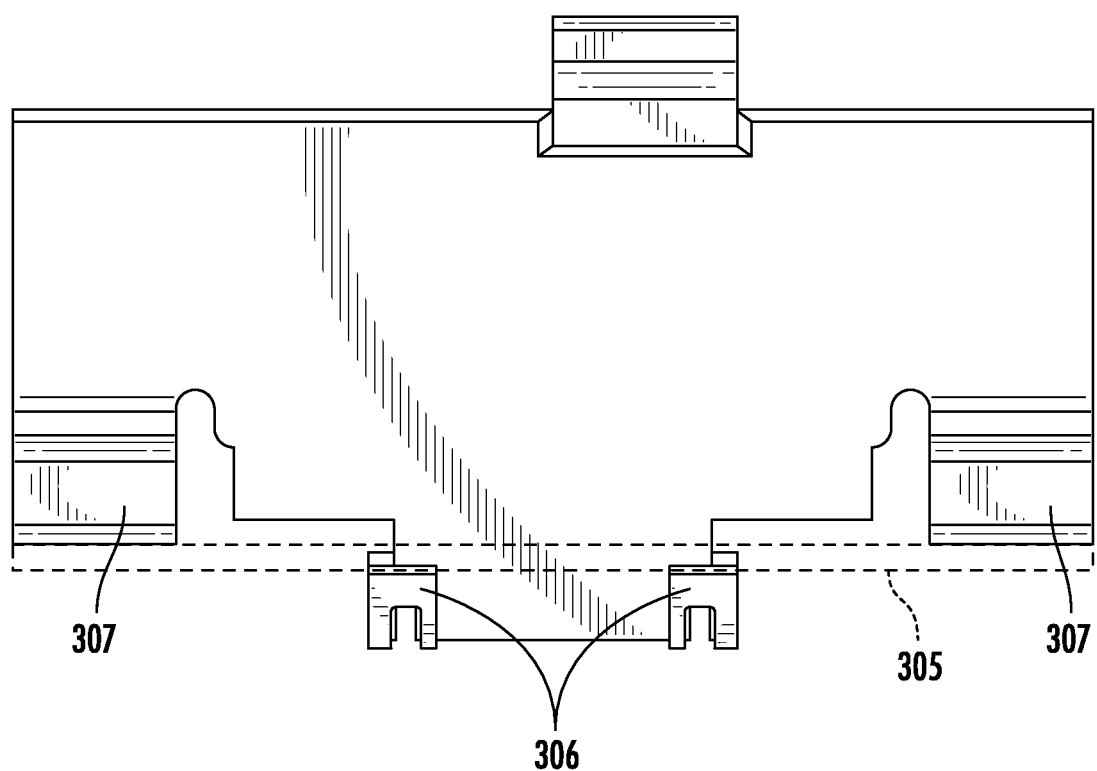
FIG. 5 is a front view of the shroud of FIG. 3.

The receiving surface 105 of the hanger 100 is typically covered by the receiving surface 305 of the shroud 300, completing coverage of the contact surfaces on the distal end of one arm 102 of the hanger 100. The formation of the shroud receiving surface 305 in one embodiment is more directly pictured in FIG. 5. The lower surfaces of the locking tab covers 307 form the upper boundary of the shroud receiving surface 305 while the upper surfaces of the locking projection covers 306 form the lower boundary. Similarly, the locking tab covers 307 enclose an inward receiving surface 309 on the inward surface 303. The lower boundary of the shroud receiving surface 305, formed by the locking tab covers 307, is adjacent to the upper boundary of the shroud receiving surface 305. In one embodiment, the receiving surface which receives the locking tabs 107 from the hanger 100 (i.e., the inward receiving surface 309) and the receiving surface which covers the distal contact surfaces of the arm 102 (i.e., the outward receiving surface 305) share a boundary formed by the locking tab covers 307. In one embodiment, a similar shroud 300 may be placed on the second arm 102 of the hanger 100; if the hanger 100 were inserted into a hole 204, as in FIG. 2, the pair of shrouds 300 would isolate the hanger 100 from the structure, the shroud 300 itself providing the mating surface with the structure 202. As the shrouds 300 are typically formed with a nonmetallic material (such as a ceramic or polymeric material), at least within the shroud receiving surface 305, the shrouds 300 may minimize or even eliminate metal-on-metal contact within the installation 200 and provide electrical isolation therebetween, thereby reducing or eliminating the possibility of the generation of PIM.

Generally, the material selected for the outward receiving surface 305 will be nonmetallic, although it is contemplated that some portions of the shroud 300 might comprise metallic materials (e.g., as a filler to increase abrasion resistance or for reinforcement or spring-like functionality in localized portions, such as within the body or within the locking feature 308). In some embodiments, however, the shroud 300 will be substantially or completely formed from a nonmetallic material, such as a dielectric material. Exemplary materials for the shroud 300 include ceramics and polymeric materials, including those optionally reinforced or filled (e.g., with fibers, beads, or particles) or unfilled. In some embodiments, the shroud 300 is formed of polymeric materials such as acetal, polyethylene, polypropylene, PVC, or the like. For instance, rubber or rubberized polymers may be used to increase the security and/or grip strength of the connection between the hanger 100 and the structure 202 or to damp and/or provide isolation from structural vibrations. Where a particular dielectric effect is desired, the thickness of the shroud may be adjusted to achieve the effect (e.g., insulative or capacitive).

Figure 6:
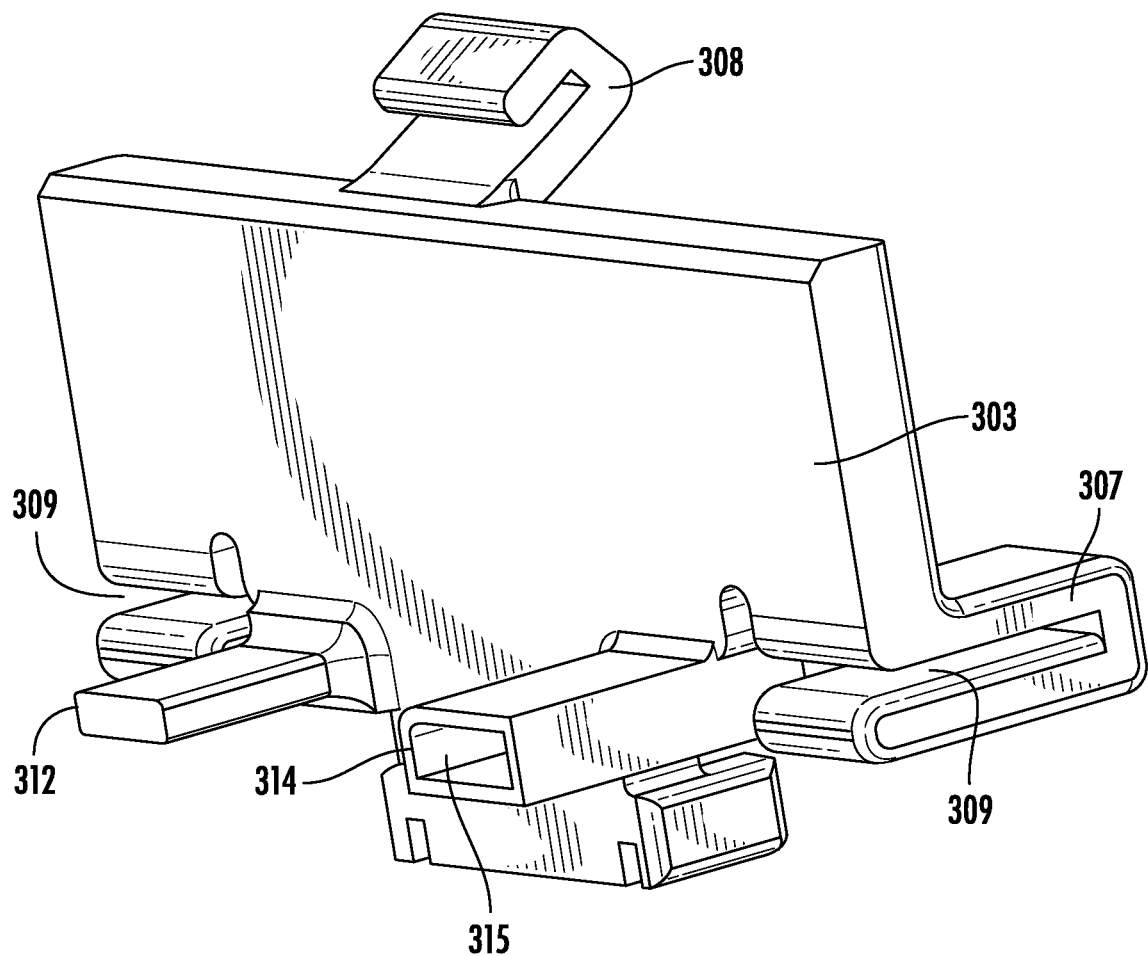
FIG. 6 is a rear perspective view of the shroud of FIG. 3.

Although some embodiments generally conform to the geometry of the underlying hanger 100, other embodiments may depart from the geometry of the hanger 100. For instance, the locking tab covers 307 may form bifurcated inward receiving surfaces 309 on the inward surface 303, which individually cover the locking tabs 107 of the hanger 100 (as shown in FIG. 6) while having a portion of the shroud body disposed therebetween. In some embodiments, the locking tab covers 307 may form an inward receiving surface 309 running the width of the shroud 300 along its inward surface 303. Alternatively, or additionally, the locking projection covers 306 may form a contiguous shelf running along at least some portion of the shroud 300 instead of the discrete and localized covers 306. Likewise, any means of locking feature 308 may be employed, whether a snap, hook, clip, or the like; it is contemplated that chemical adhesives, including thermoplastic or thermoset adhesives, may substitute for or supplement a mechanical locking feature 308.

In some embodiments, the shroud 300 may be manufactured directly onto the hanger 100. For instance, the hanger 100 may be dipped into a thermoplastic or thermoset polymer in a molten state, after which the polymer hardens and forms a shroud 300 intimately bonded and conforming to the hanger 100. Similarly, the shroud 300 may be formed by spraying a material onto the hanger 100, or by casting or molding a material around the hanger 100. In some embodiments, the shroud 300 may cover only a portion or the entirety of the hanger 100. In other embodiments, the shroud 300 may be manufactured separately (e.g., by injection molding or additive manufacturing) and subsequently attached to the hanger 100. For instance, a shroud 300 may be manufactured in a single step with a single material, or may optionally have various materials molded to or otherwise deposited on other portions (e.g., applying a rubberized material to the outward receiving surface 305 while forming the locking projection covers 306 or locking feature 308 to contain a more rigid material or combination of materials).

Figure 7:
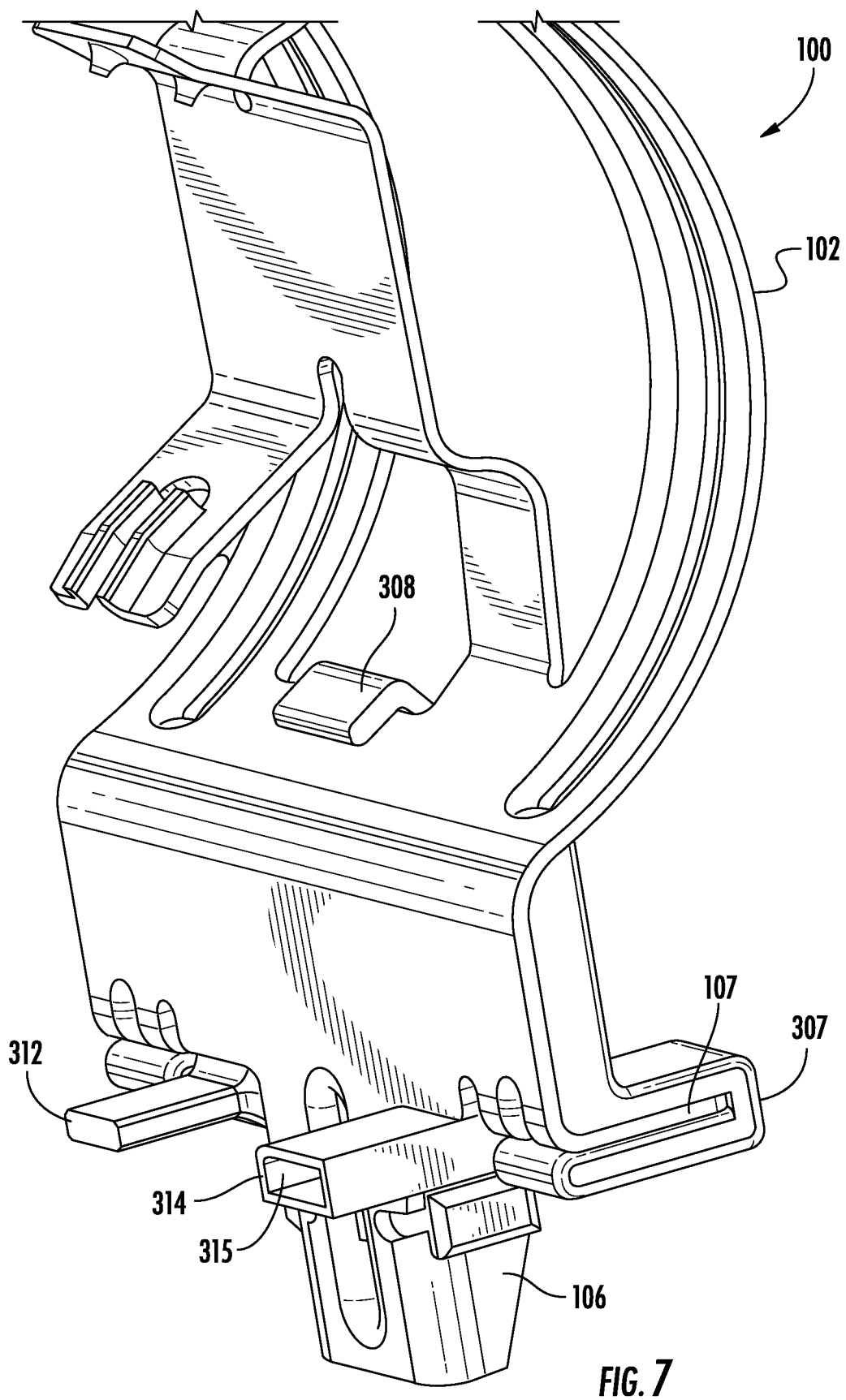
FIG. 7 is a partial rear perspective view of the shroud of FIG. 3 attached to a cable hanger of FIG. 1.

In some embodiments, the shroud 300 may improve the grip between the hanger 100 and the structure 202 in an installation 200, advantageously improving the stability of the cable mounting. The security of the connection between the hanger 100 and the structure 202 in an installation 200 may also be improved by a mechanical interference mechanism. In one embodiment, the interference mechanism employs at least one projection on the shroud 300. FIG. 6 shows the inward surface 303 of a shroud 300. In the pictured embodiment, the shroud 300 contains two projections extending from the inward surface 303 of the shroud 300: a first projection 312 and a second projection 314. The second projection 314 contains a cavity 315. FIG. 7 demonstrates how the projections 312 and 314 may extend into the area between the arms 102 of the hanger 100 when the shroud 300 is installed.

Figure 8:
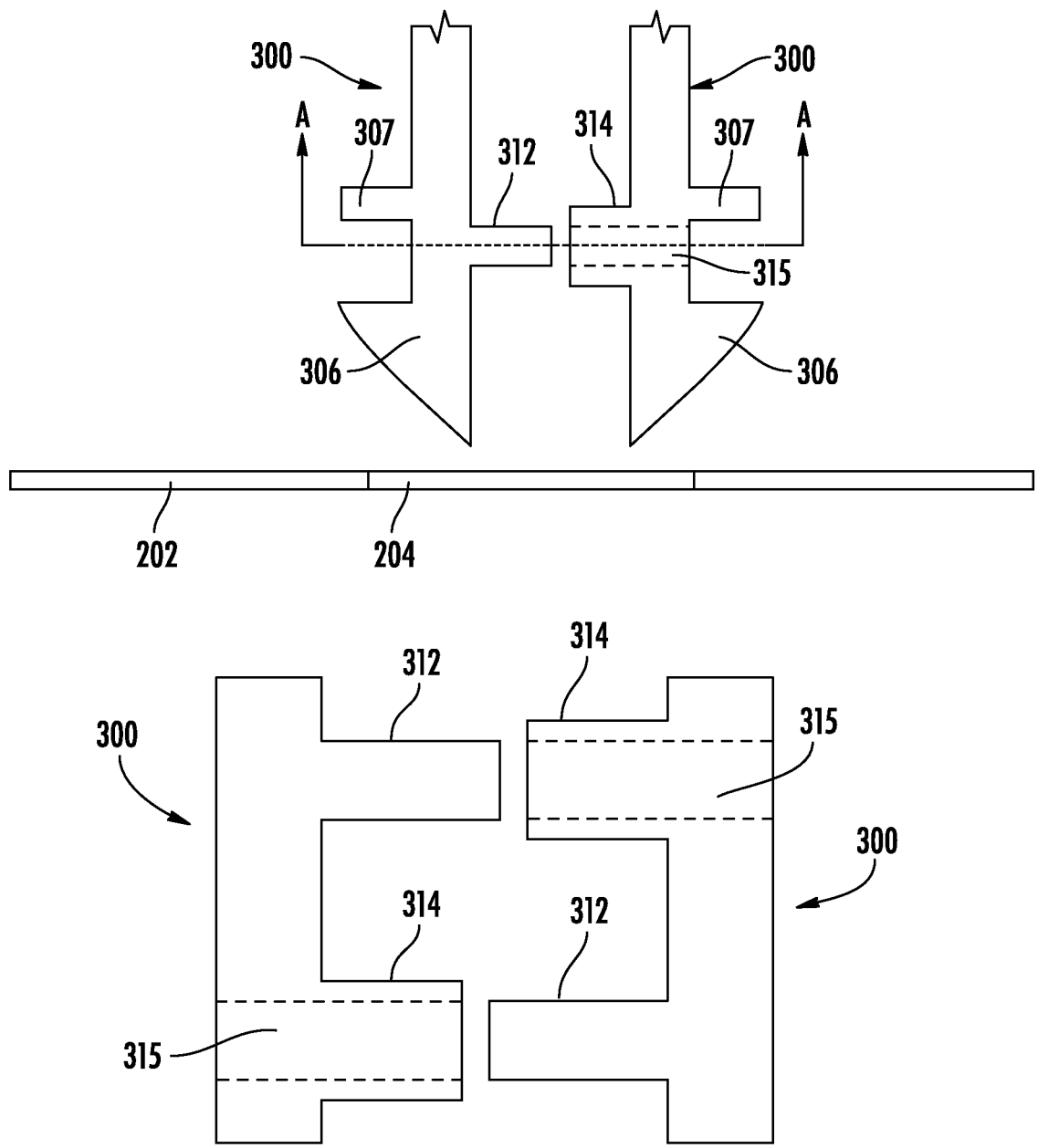
FIG. 8 shows schematic side and section views of one embodiment of a first shroud of FIG. 3 interacting with a second shroud of FIG. 3. The shrouds are shown in a detached condition prior to passing through an aperture in a structure.

In one configuration, two substantially identical shrouds 300 are arranged in a substantially opposing orientation as shown in FIG. 8, as they would typically be if they were attached to opposing arms 102 of a hanger 100. Each shroud 300 has a first projection 312 and a second projection 314, within which lies a cavity 315. In general, the cavity 315 may be sized so that the projection 312 of one shroud 300 may suitably slide into the cavity 315 of the other shroud 300. The length of the projections 312 and 314 may be measured normal to the inward surface 303. The width of the projections 312 and 314 (and the cavity 315) may be measured parallel to the receiving surface 305 (generally into the page as shown in the schematic side view of FIG. 8). The height of the projections 312 and 314 (and the depth of the cavity 315) may be measured in a direction perpendicular to the length and the width. If the length, width, and height of the first projection 312 are smaller than the depth, width, and height, respectively, of the cavity 315 of the second projection 314, then the projection 312 of the first shroud 300 will typically fit within the cavity 315 of the second shroud 300.

Figure 9:
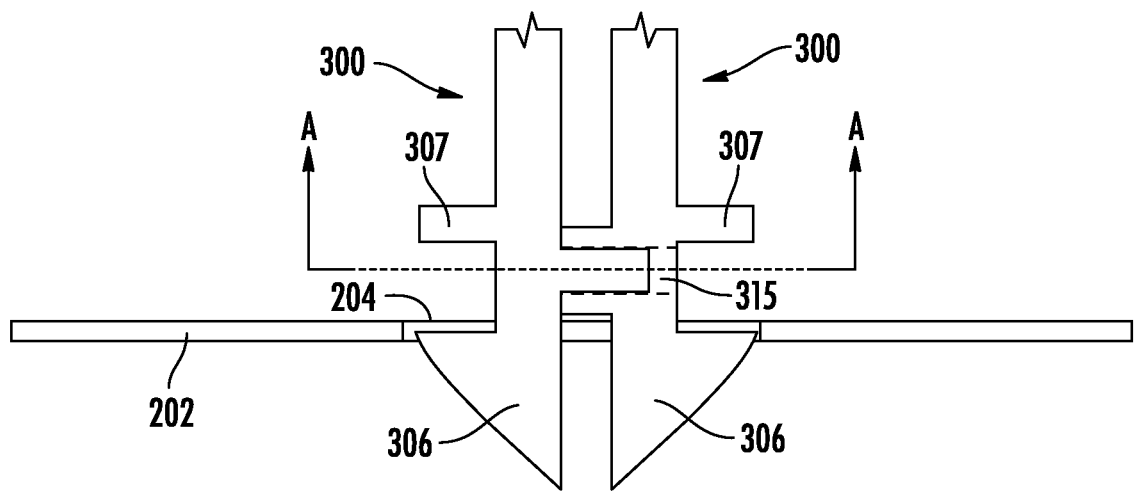
FIG. 9 shows schematic side and section views of the first and second shrouds of FIG. 8. The shrouds are shown in an engaged condition while passing through an aperture in a structure.
Figure 9:
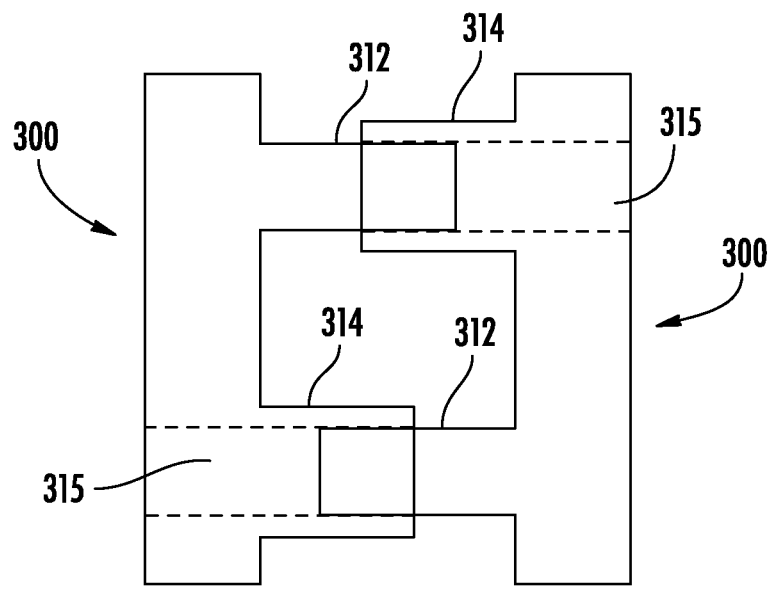
Figure 10:
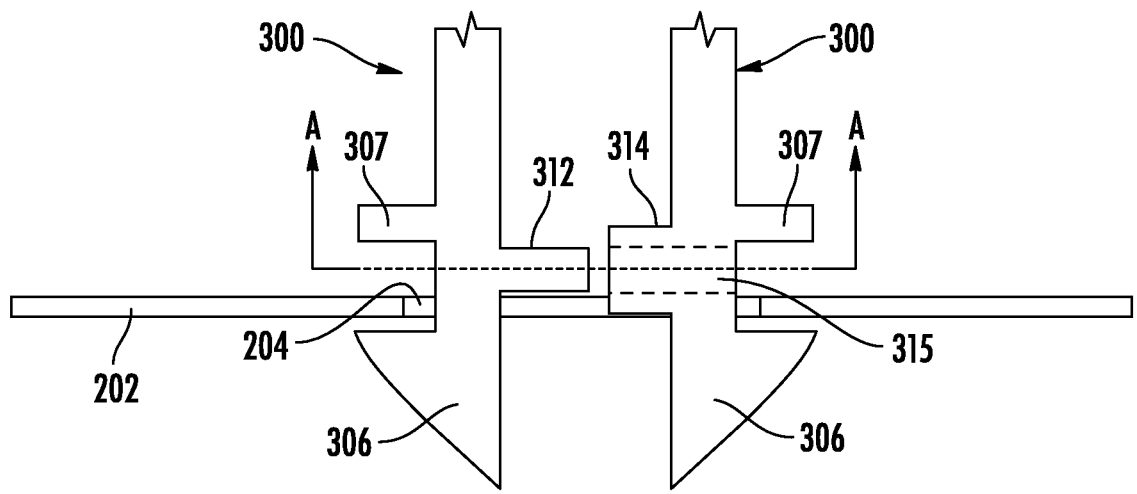
FIG. 10 shows schematic side and section views of the first and second shrouds of FIG. 8. The shrouds are shown in a detached condition while engaging an aperture in a structure.
Figure 10:
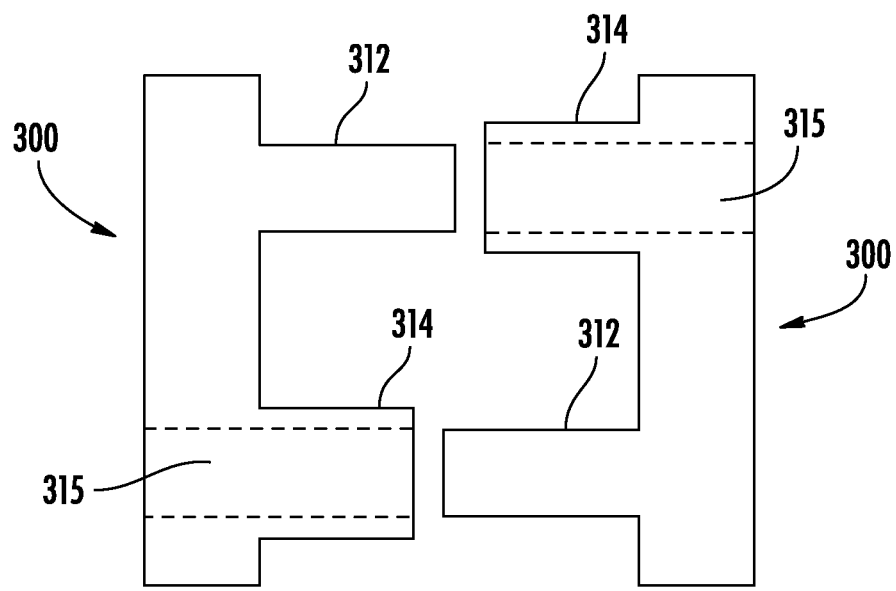

When two shrouds 300 are installed on a hanger 100, the projections 312 and 314 on each may interact as the arms 102 of the hanger 100 are pinched or squeezed together for installation. For example, in FIG. 8, the projections 312 and the cavities 315 are aligned substantially or entirely in the direction or along the path that the arms 102 of the hanger 100 travel during installation, and, if the dimensions are appropriately selected, the projections 312 will typically insert into the opposite projections 314—as shown in FIG. 9—as projections 312 are received into the cavities 315. For clarity, only one projection 312 and one cavity 315 are shown in the schematic side view. The collapse of the shrouds 300 together generally permits the locking projections 106, optionally partially or completely enclosed in locking projection covers 306 as shown, to fit through an aperture 204 of a structure 202. Once the locking projections 106 are inserted through the aperture 204, the arms 102 may be released, permitting the locking projections 107 to engage with the structure 202 via the rim of the aperture 204, as shown in FIG. 10.

Figure 11:
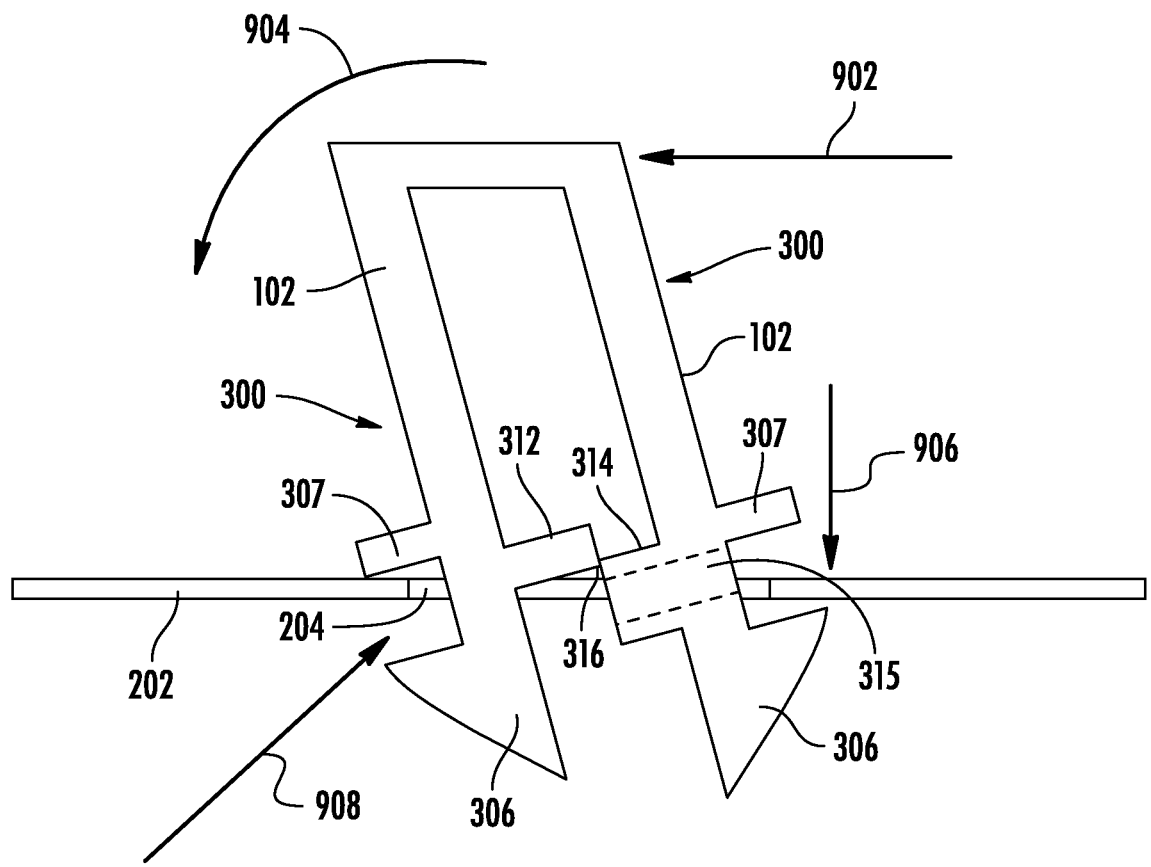
FIG. 11 is a schematic side view of the first and second shrouds of FIG. 8. The shrouds are shown interfering with each other as the hanger deforms in reaction to an applied load while engaging with an aperture in a structure.

After installation, the hanger 100 may deflect or shift under operational and/or environmental loads (e.g., wind). The interaction of the projections 312 and 314 may be configured to vary depending on the load condition. For instance, in contrast to the substantially symmetric force applied to both arms 102 during installation, various environmental loads (e.g., from rain, snow, wind, cable inertia, wildlife, etc.) will be applied asymmetrically during operation, and the hanger 100 will experience torque and the arms 102 will not deform or pinch together in a symmetric fashion. For example, FIG. 11 depicts a cable hanger experiencing a transverse load 902 (e.g., from wind) applied near and substantially parallel to the base panel 104 of the hanger 100. Because the hanger 100 is restrained within the hanger assembly 200 by the asymmetric reaction forces 908 and 906 exerted by the structure 202 on the hanger 100, a net moment 904 is induced within the cable hanger 100, deforming the hanger 100. In some cases, the deformation may cause one arm 102 to rotate and be forced away from the structure 202 while the other arm 102 also rotates and is forced toward the structure 202. In this manner, the projections 312 and 314 may fall out of alignment, depending on the load condition.

Figure 12:
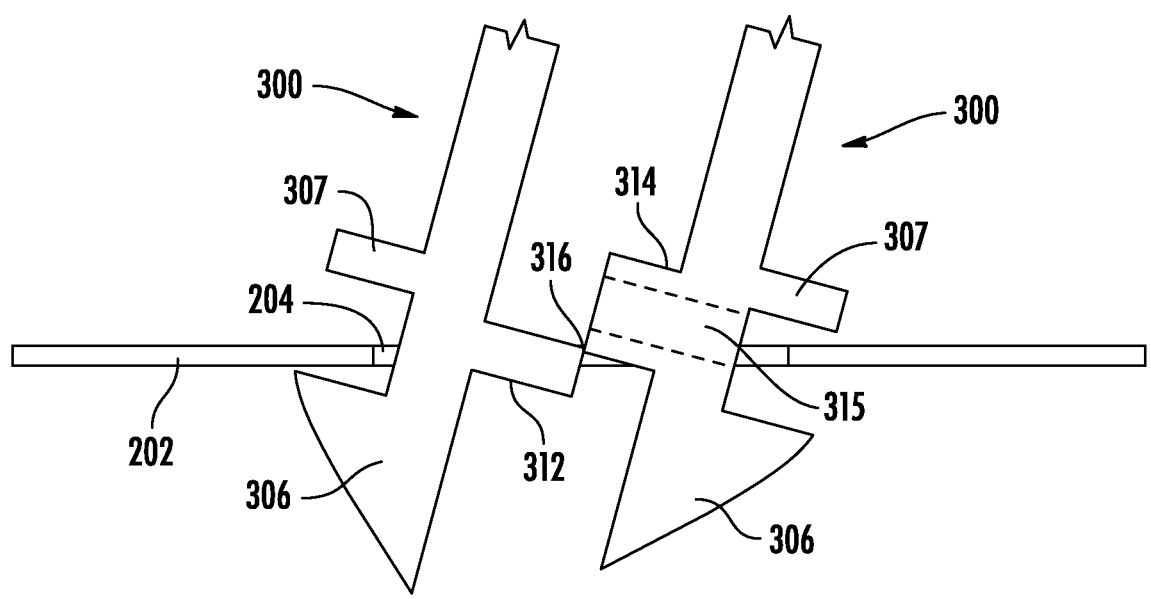
FIG. 12 is a schematic side view of the shrouds of FIG. 11. The shrouds are shown interfering with each other as the hanger deforms under an oppositely applied load.

While the foregoing offers one example of a scenario in which the projections 312 and 314 fall out of alignment, the misalignment of the shrouds 300 may arise any time the hanger 100 experiences asymmetric loading and the arms 102 deform in an asymmetric fashion. FIGS. 11 and 12 depict exemplary scenarios in which the projections 312 are not in alignment with the cavities 315. When misaligned, the projections 312 and the cavities 315 do not insert together; the projections 312 are not received in the cavities 315. Instead, they interfere with the opposing shroud 300, typically abutting along an interference surface 316. In a hanger installation 200, as shown in FIG. 2, the interference of the shrouds 300 would advantageously prevent or impede the collapse of the arms 102 together, increasing the security of the connection of the hanger 100 within the reinforced hole 204 by preventing the locking projections 106 from escaping the aperture or hole 204.

Figure 13:
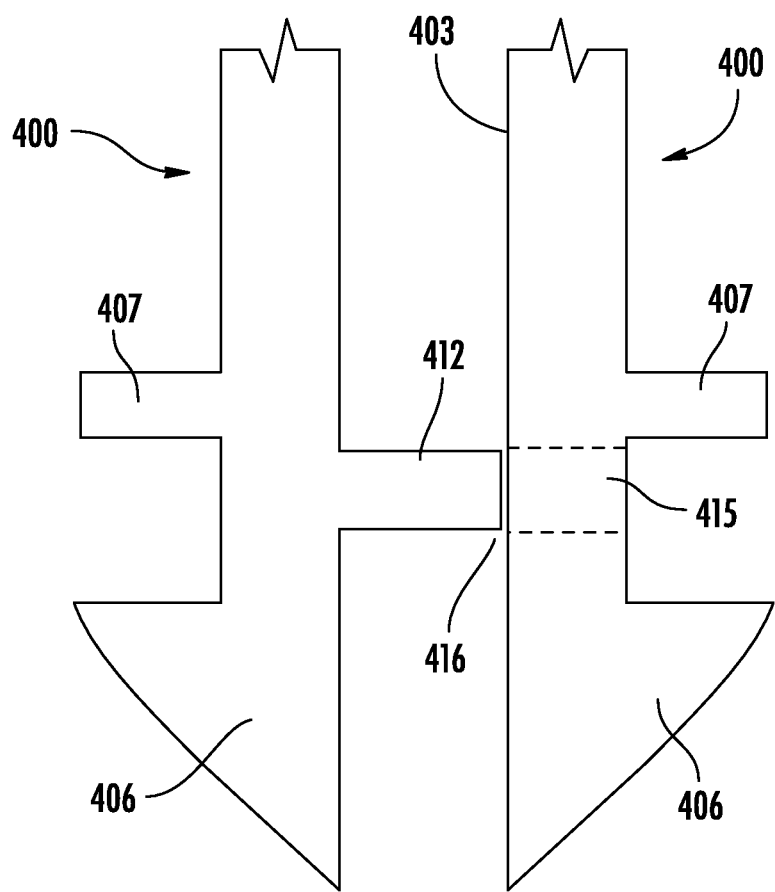
FIG. 13 is a schematic side view of a first shroud interacting with a second shroud according to additional embodiments of the invention, wherein the shrouds are shown in a detached condition.

The above-described mechanism is but one example of how the interference mechanism may adaptively permit the installation of the hanger 100 onto a structure 202 (i.e., when arms 102 are intentionally pinched or squeezed) while preventing or impeding the accidental removal or escape of the hanger 100 from the structure 202 when it is not desired (i.e., when natural or artificial loads are experienced in operation). The nature of the interaction between the projections 312 and 314 of two opposing shrouds 300 may change depending on the geometry of the projections 312 and 314. For instance, a projection is but one type of interference feature. A cavity may be an interference feature on its own. For example, the length of a second projection 314 may be very short. Alternatively, the second projection 314 may be substantially or entirely coincident with the inward surface 303 (i.e., having a length of zero units). FIG. 13 depicts an embodiment of a shroud 400 in which a rim of the cavity 415 is on the inward surface 403. Thus, as the shrouds 400 move together, the projection 412 may align and insert into the cavity 415 or may abut the inward surface 403, and the inward surface 403 may form an interference surface 416 (such as to maintain the locking projection covers 406 and the locking tab covers 407 in a particular position).

Figure 14:
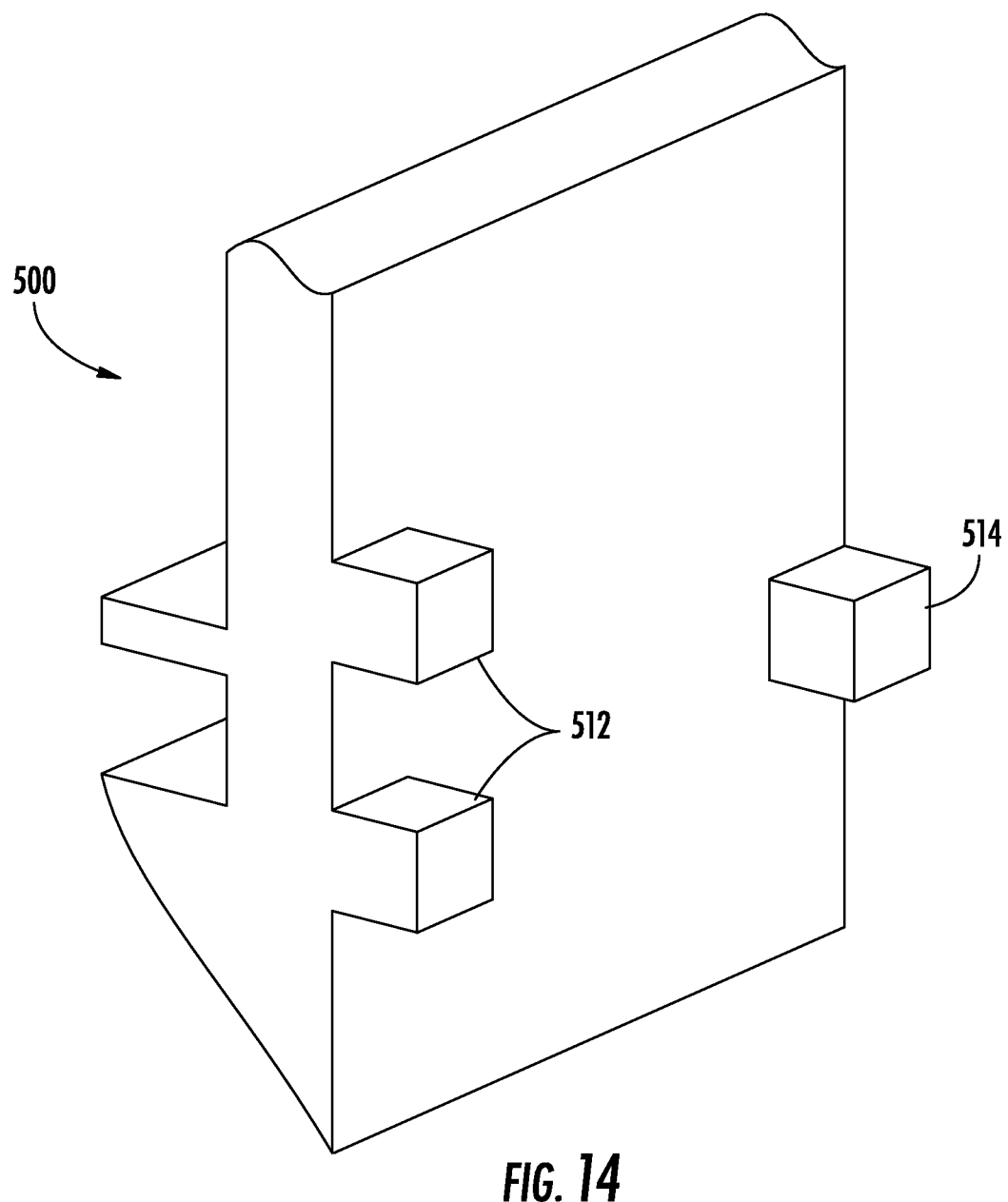
FIG. 14 is a front perspective view of another embodiment of a shroud of the present invention.
Figure 15:
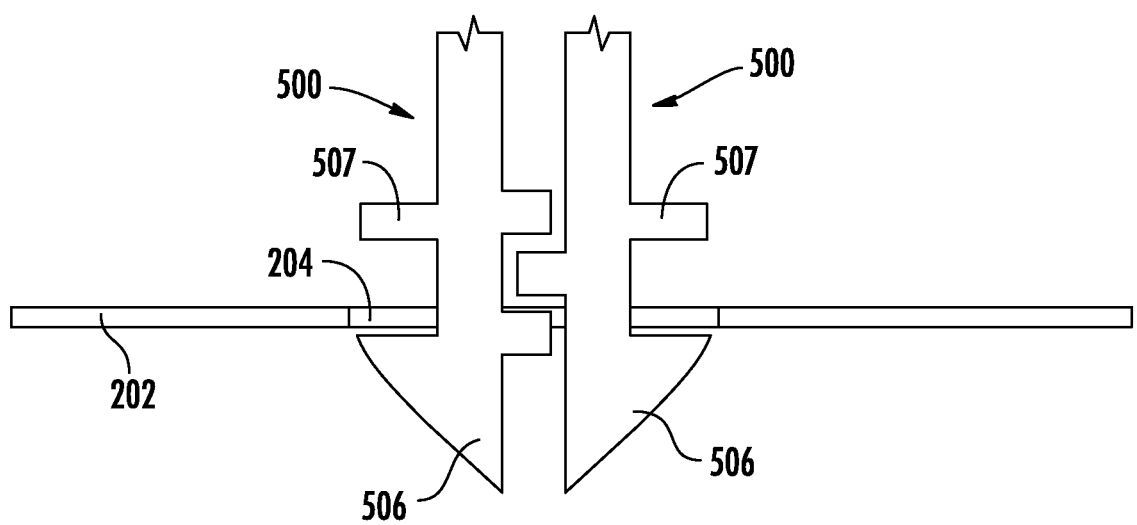
FIG. 15 is a schematic side view of the first and second shrouds of FIG. 14 interacting, wherein the shrouds are shown inserting into each other while passing through an aperture in a structure.
Figure 16:
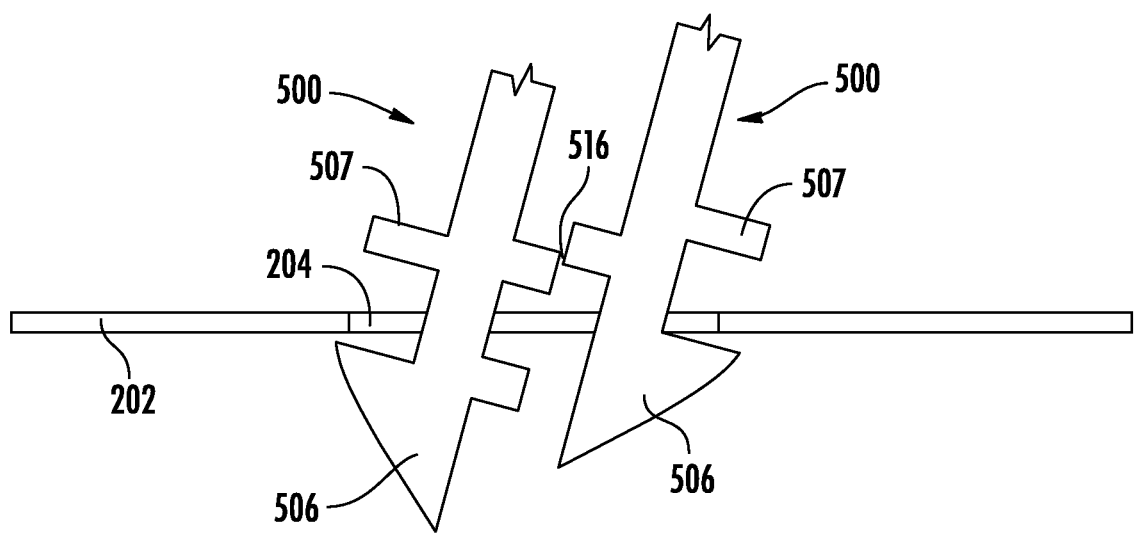
FIG. 16 is a schematic side view of the shrouds of FIG. 15. The shrouds are shown interfering with each other while engaging with an aperture in a structure.
Figure 17:
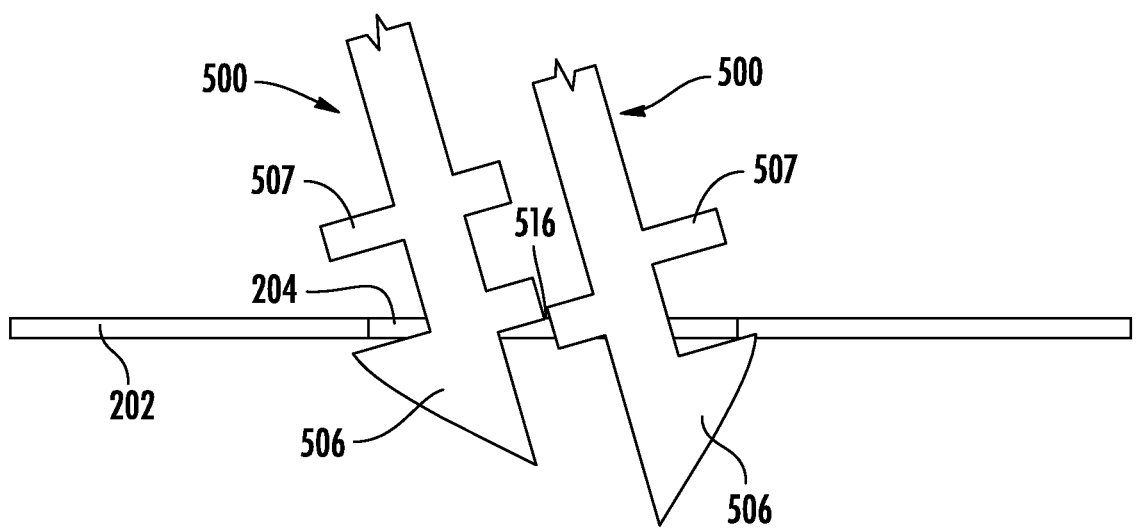
FIG. 17 is a schematic side view of the shrouds of FIG. 15. The shrouds are shown interfering with each other while engaging with an aperture in a structure.

In alternative embodiments, multiple interference features may comprise one or more projections, as in the embodiment of a shroud 500 shown in FIG. 14. The interference feature 512 may comprise two or more projections. When substantially identical shrouds 500 are opposed, they may adaptively align and misalign in the above-described manner, permitting the opposing interference features 512 and 514 to insert together and collapse, as in FIG. 15 (such as to allow the locking projection covers 506 to fit within an aperture 204), or misalign and interfere along an interference surface 516, as in FIGS. 16 and 17 (such as to prevent or impede the edge of the aperture 204 from escaping from between the locking projection covers 506 and the locking tab covers 507).

Figure 18:
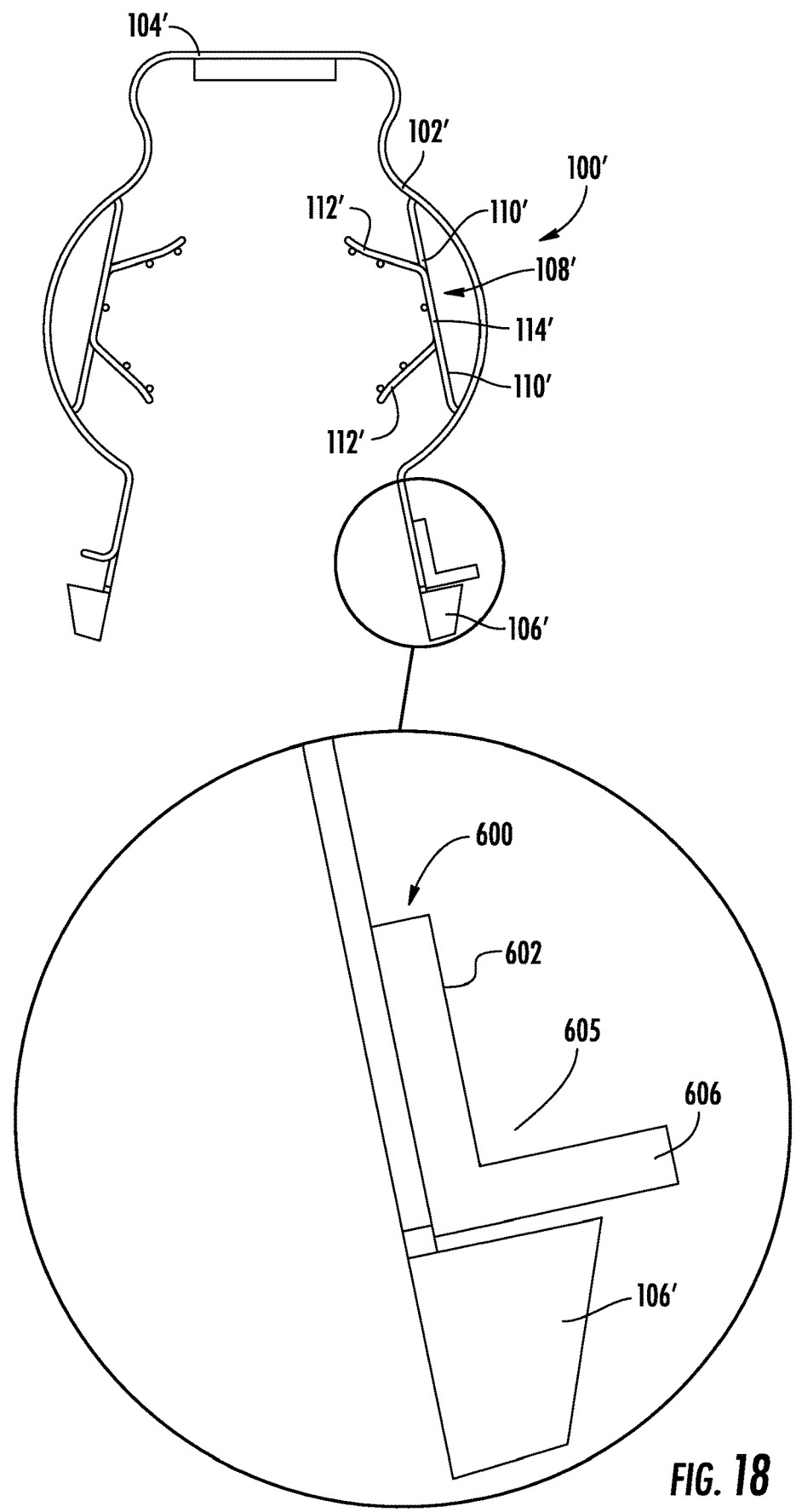
FIG. 18 shows side and enlarged views of an alternative embodiment of a shroud attached to a cable hanger.

While FIGS. 3-17 generally depict receiving surfaces, e.g., receiving surfaces 305 and 309, as forming an enclosure or channel for receiving an aperture 204 (of the structure 202) or the locking tabs 107, some embodiments may contain at least one open or partially open receiving surface. For example, FIG. 18 depicts one embodiment of a shroud 600 adapted for a cable hanger 100' which has locking projections 106' but no locking tabs 107. Thus, the shroud 600 is not adapted to engage with any locking tabs 107: the shroud 600 has one outward receiving surface 605 for engaging with an aperture 204. The outward receiving surface 605 is open, formed by a projection or shelf which may also include the locking projection cover 606. Instead of enclosing the locking projections 106', the cover 606 may only abut the contact surface of the locking projections 106'. When engaging with an aperture 204, the aperture 204 will generally contact the outward receiving surface 605, which cradles or otherwise captures the aperture 204 between the locking projection cover 606 and the outward surface 602.

Figure 19:
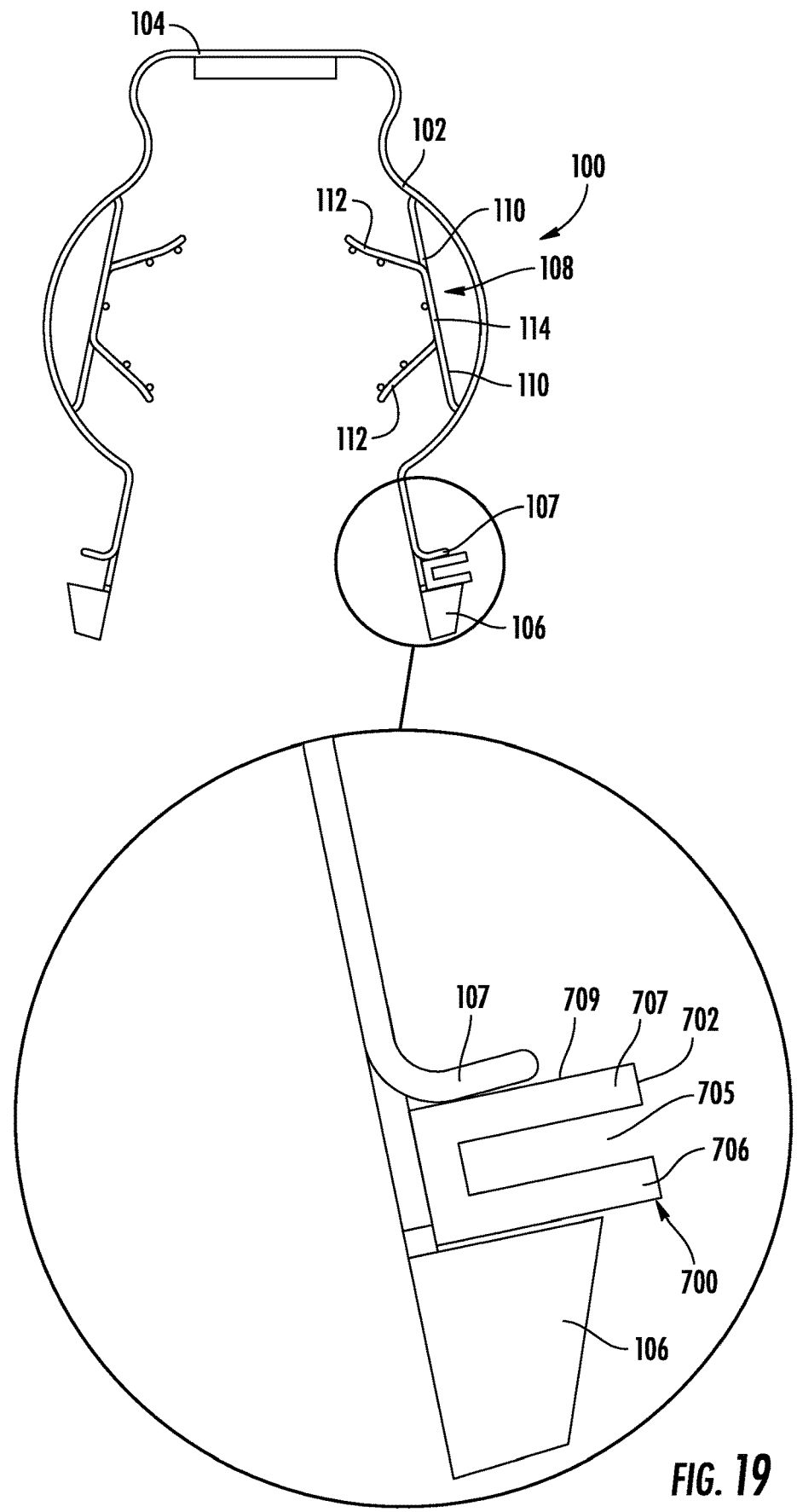
FIG. 19 shows side and enlarged views of an additional embodiment of a shroud attached to a cable hanger.
Figure 20:
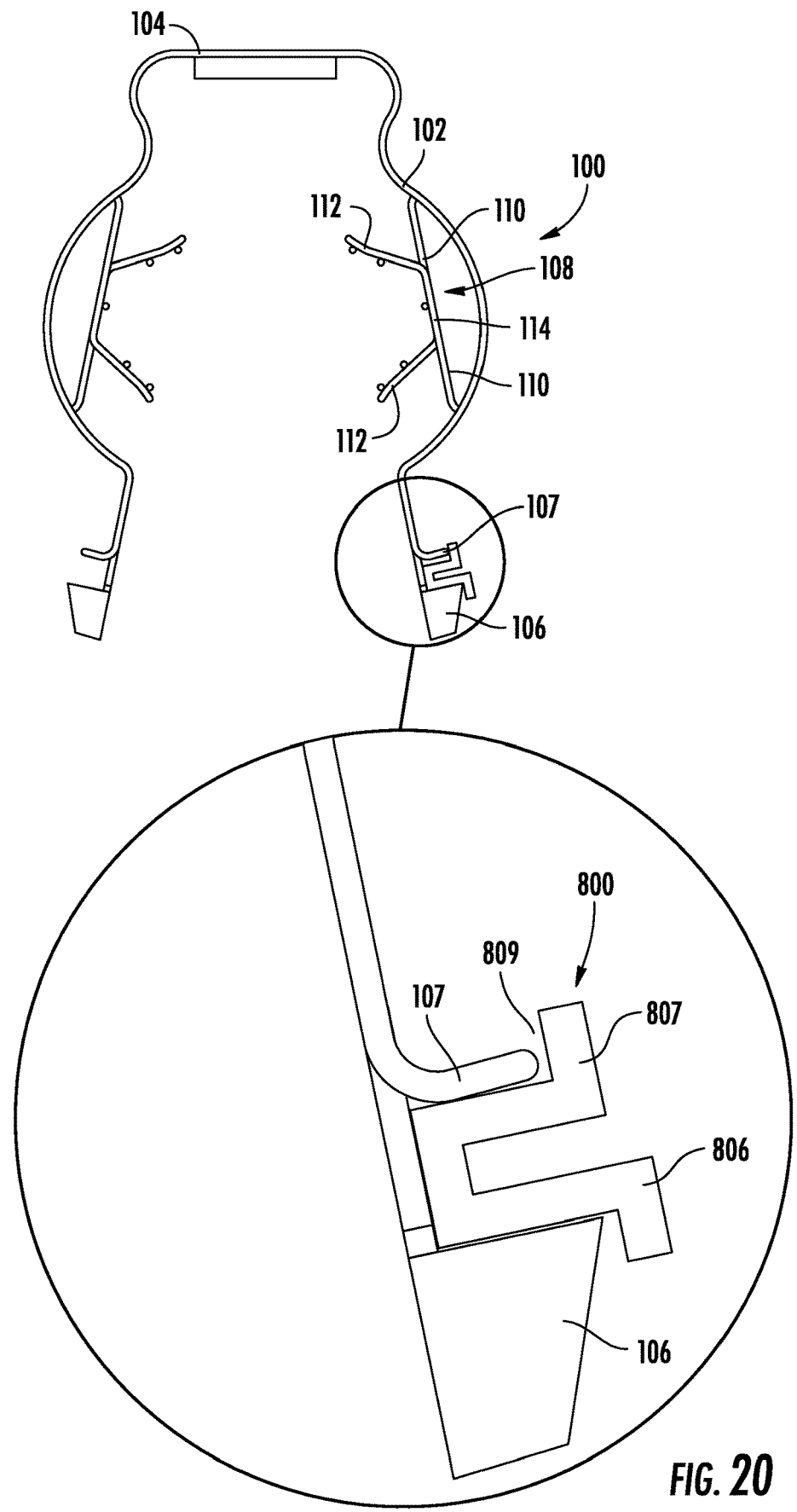
FIG. 20 shows side and enlarged views of a further embodiment of a shroud attached to a cable hanger.

In an alternative embodiment, as shown in FIG. 19, a shroud 700 has an open inward receiving surface 709 which receives the locking tab 107 of a hanger 100. The inward receiving surface 709 forms a ledge or flange which may also include the locking tab cover 707. Instead of enclosing the locking tabs 107, the cover 707 may only abut the locking tabs 107 and terminate along the outward surface 702. When engaging with an aperture 204, the aperture 204 will generally contact the outward receiving surface 705 (which may take the form of a channel, as depicted), which cradles the aperture 204 between the locking projection cover 706 and the locking tab cover 707. In an alternative embodiment, as shown in FIG. 20, the open inward receiving surface 809 of a shroud 800 has a lip or flange which forms an open channel which may receive and partially enclose the locking tab 107 within the locking tab cover 807. Additionally, or alternatively, the locking projection cover 806 may have a similar lip or flange. The lips and/or flanges may, for example, engage with the locking projections 106 or the locking tabs 107 to index the shroud 800 on the hanger 100. Any lips and/or flanges may also provide mistakeproofing functionality to aid installation of the shroud 800 onto the hanger 100, such as by limiting the shroud 800 to fit onto the hanger 100 in only one orientation, or even to aid installation of the hanger 100 onto a structure 202 by providing a positive insertion depth stop or interfacing with other orientating features on the structure 202 or on a cable jacket. In other embodiments, the shrouds 800 are configured for universal fit in a number of orientations to permit quick and interchangeable installation.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A shroud for a cable hanger, the cable hanger having a pair of arms, the shroud comprising a body, the body having an outward surface and an inward surface;
   wherein the inward surface is configured to engage an outer surface of a single one of the arms and includes at least one interference feature configured to impede distal end portions of the arms from collapsing together; and
   wherein the at least one interference feature comprises a projection extending inwardly from the inward surface.

2. The shroud of claim 1, wherein the inward surface includes at least one inward receiving surface.

3. The shroud of claim 2;
   wherein the outward surface includes an outward receiving surface having an upper boundary;
   wherein the inward receiving surface has a lower boundary; and
   wherein the upper boundary of the outward receiving surface is adjacent to the lower boundary of the inward receiving surface.

4. The shroud of claim 1, wherein the body comprises a locking feature, the locking feature being configured to mate with a cable hanger.

5. The shroud of claim 1,
   wherein a first interference feature includes a projection, the projection having a length extending away from the inward surface, a width parallel to the inward receiving surface and perpendicular to the length, and a height perpendicular to the width of the projection and the length;
   wherein a second interference feature includes a cavity, the cavity having a depth extending into the inward surface, a width parallel to the inward receiving surface and perpendicular to the depth, and a height perpendicular to the width of the cavity and the depth; wherein the width of the cavity is greater than the width of the projection; and
   wherein the height of the cavity is greater than the height of the projection.

6. The shroud of claim 3, wherein the outward receiving surface comprises a dielectric material.

7. The shroud of claim 3, wherein the outward receiving surface comprises an indexing slot.

8. A cable hanger, comprising:
   a base panel;
   a first arm having a proximal end and a distal end, the proximal end being attached to the base panel, the distal end comprising first locking projections configured to be inserted into an aperture of a structure, the first locking projections comprising a first contact surface;
   a second arm having a proximal end and a distal end, the proximal end being attached to the base panel, the distal end comprising second locking projections configured to be inserted into the aperture of the structure, the second locking projections comprising a second contact surface;
   a first shroud disposed along the first contact surface; and
   a second shroud disposed along the second contact surface.

9. The cable hanger of claim 8,
   wherein the first shroud comprises a first inward surface and a first outward surface, the first inward surface having a first interference feature disposed thereon, the first inward surface being adjacent to the first contact surface, the first outward surface being configured to mate with the aperture of the structure; and
   wherein the second shroud comprises a second inward surface and a second outward surface, the second inward surface having a second interference feature disposed thereon, the second inward surface being adjacent to the second contact surface, the second outward surface being configured to mate with the aperture of the structure.

10. The cable hanger of claim 9,
    wherein the first interference feature and the second interference feature are configured to assume a first aligned position when a load applied to the first shroud is approximately symmetric to a load applied to the second shroud, and
    wherein the first interference feature and the second interference feature are configured to assume a second misaligned position when a load applied to the first shroud is asymmetric to a load applied to the second shroud.

11. The cable hanger of claim 10,
    wherein the first interference feature is configured to insert into the second interference feature in the first aligned position; and
    wherein the first interference feature is configured to interfere with the second interference feature in the second misaligned position.

12. The cable hanger of claim 8, wherein the first shroud comprises at least two interference features and the second shroud comprises at least two interference features.

13. The cable hanger of claim 8, wherein the first shroud abuts the first locking projections and the second shroud abuts the second locking projections.

14. The cable hanger of claim 8, wherein the first shroud encloses the first locking projections and the second shroud encloses the second locking projections.

15. The cable hanger of claim 8, wherein the first shroud abuts the first locking tabs and the second shroud abuts the second locking tabs.

16. The cable hanger of claim 8, wherein the first arm includes a first locking tab and the second arm includes a second locking tab, and wherein the first shroud encloses the first locking tabs and the second shroud encloses the second locking tabs.

17. The cable hanger of claim 8, wherein at least one of the first shroud and the second shroud is chemically adhered or mechanically secured to the cable hanger.

18. The cable hanger of claim 8, wherein at least one of the first shroud and the second shroud comprises a dielectric material.

19. The cable hanger of claim 8, wherein at least one of the first shroud and the second shroud is manufactured directly onto the cable hanger.

20. A method for hanging a cable comprising the step of attaching the cable hanger of claim 8 to a structure.

\* \* \* \* \*